US008850142B2

(12) United States Patent
Gold

(10) Patent No.: US 8,850,142 B2
(45) Date of Patent: Sep. 30, 2014

(54) ENHANCED VIRTUAL STORAGE REPLICATION

(75) Inventor: Stephen Gold, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1078 days.

(21) Appl. No.: 12/560,268

(22) Filed: Sep. 15, 2009

(65) Prior Publication Data

US 2011/0066799 A1    Mar. 17, 2011

(51) Int. Cl.
*G06F 12/00* (2006.01)
*G06F 11/14* (2006.01)

(52) U.S. Cl.
CPC ...... *G06F 11/1453* (2013.01); *G06F 2201/815* (2013.01); *G06F 11/1456* (2013.01)
USPC .............. 711/162; 711/111; 711/E12.103

(58) Field of Classification Search
USPC .................................. 711/162, 111
See application file for complete search history.

(56) References Cited

U.S. PATENT DOCUMENTS

| | | | |
|---|---|---|---|
| 5,119,368 A | 6/1992 | Hiltner et al. | |
| 5,600,653 A | 2/1997 | Chitre et al. | |
| 5,604,862 A * | 2/1997 | Midgely et al. | 711/161 |
| 6,317,814 B1 * | 11/2001 | Blendermann et al. | 711/162 |
| 6,601,187 B1 | 7/2003 | Sicola et al. | |
| 6,947,981 B2 | 9/2005 | Lubbers et al. | |
| 7,007,129 B2 * | 2/2006 | Sekine et al. | 711/4 |
| 7,149,858 B1 | 12/2006 | Kiselev | |
| 7,383,407 B1 | 6/2008 | Kiselev | |
| 7,506,011 B2 | 3/2009 | Liu et al. | |
| 7,653,821 B2 * | 1/2010 | Johnson | 713/193 |
| 2004/0044842 A1 * | 3/2004 | Trimmer et al. | 711/111 |
| 2004/0044863 A1 * | 3/2004 | Trimmer et al. | 711/161 |
| 2006/0200623 A1 * | 9/2006 | Gonzalez et al. | 711/111 |
| 2008/0250076 A1 * | 10/2008 | Muller et al. | 707/200 |

OTHER PUBLICATIONS

ARCserve 2000 Administrator Guide, Version 7.0, Computer Associates, Aug. 2004.*

* cited by examiner

*Primary Examiner* — Aracelis Ruiz

(57) ABSTRACT

Systems and methods of enhanced virtual storage replication are disclosed. An exemplary method comprises moving a virtual tape from a local virtual library to a remote virtual library. The method also comprises ejecting the virtual tape moved to the remote virtual library. The method also comprises recycling the ejected virtual tape at the local virtual library based on a remote retention policy.

19 Claims, 3 Drawing Sheets

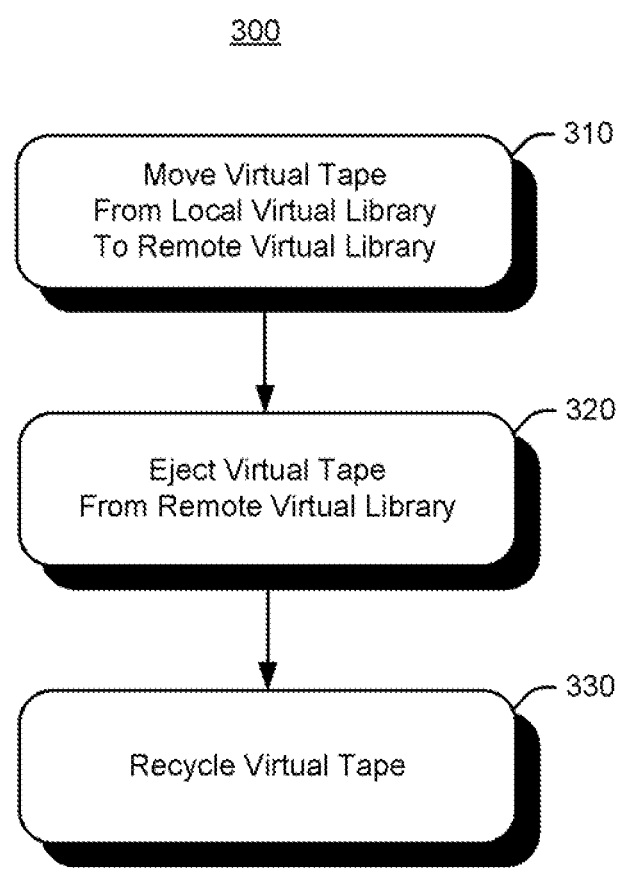

ENHANCED VIRTUAL STORAGE REPLICATION

BACKGROUND

Storage devices commonly implement data replication operations using local and remote virtual library storage (VLS) for data recovery, also commonly referred to as "automigration" or "tape caching." Automigration automatically mirrors virtual "tapes" on a local VLS to a remote device (either another VLS or a physical library).

A user may want to have different retention times for backup data on the local and remote libraries. For example, the user may want to store one month of backup data locally while storing six months of backup data at the remote library. However, strict identity between the local and remote libraries needed to implement automigration operations prohibits different retention times. By definition, strict identity or having the same data on both the local and remote libraries, necessitates the same retention time for both devices.

It may be possible to implement an out-of-band application programming interface (API) between the backup application and the virtual library (e.g. using the SMI-S or NDMP protocols) to allow the backup application to control the copy processes between the two virtual libraries. By allowing the backup application to control the copy processes, the local and remote tapes may be managed independently (e.g., have different barcodes and therefore be recognized as two different tapes by the backup application). However, this scheme would require significant changes to the backup application to support the API. Most if not all commercially available backup applications do not have this capability.

BRIEF DESCRIPTION OF THE DRAWINGS

FIG. 3 is a flow diagram illustrating exemplary operations which may be implemented for enhanced virtual storage replication.

DETAILED DESCRIPTION

Figure 1:
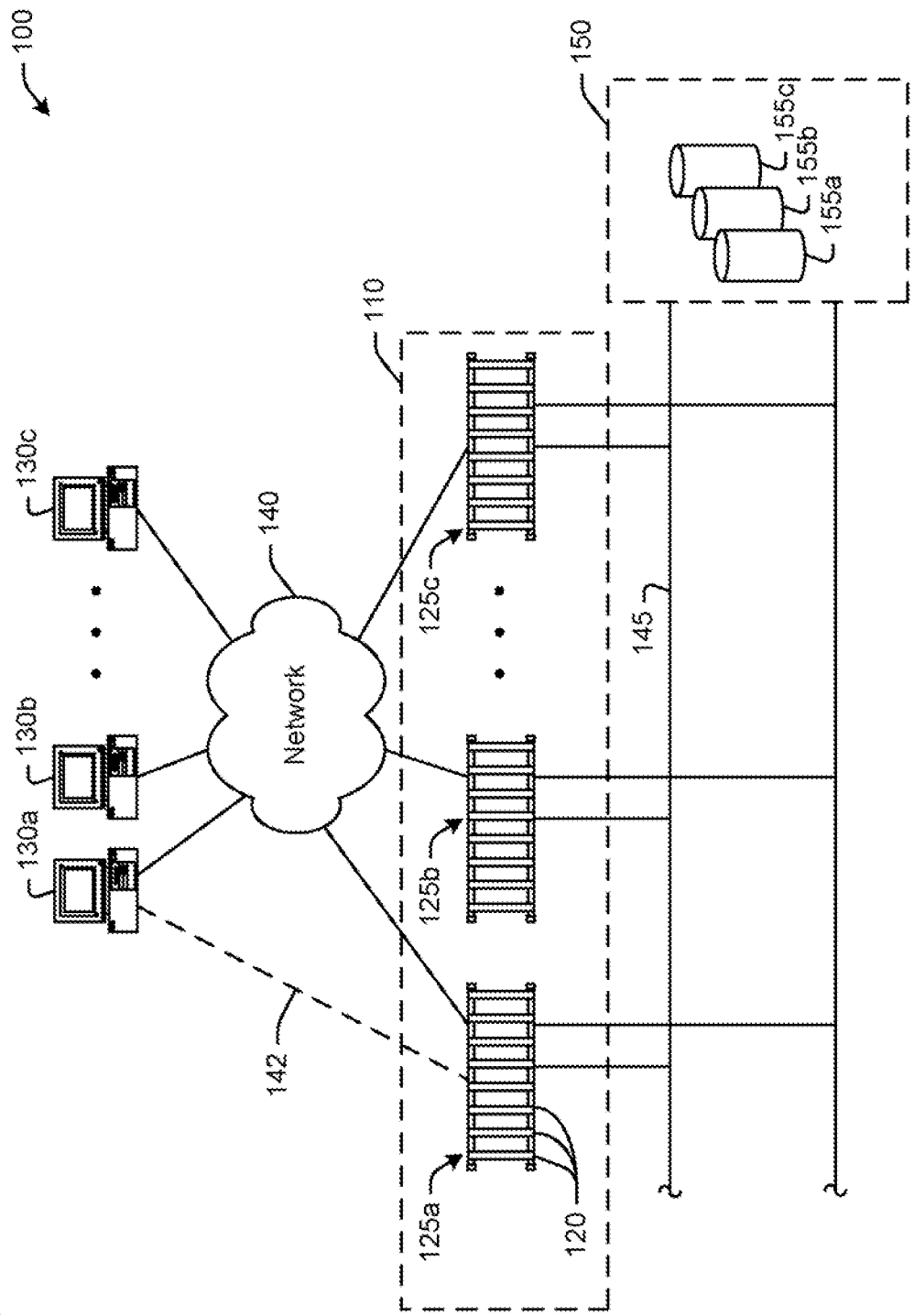
FIG. 1 is a high-level diagram showing an exemplary storage system including both local and remote storage.

Systems and methods are disclosed for enhanced virtual storage replication. It is noted that the term "replication" is used herein to refer to backup operations including echo-copy and other proprietary and non-proprietary data operations now known or later developed. Briefly, a storage system is disclosed including a local storage device and a remote storage device. Data (e.g., backup data for an enterprise) is maintained in a virtual storage library at the local storage device. The data can be replicated to another virtual storage library at the remote storage device.

As briefly mentioned above, for automigration to function properly with the backup application there needs to be identity between the tapes on the local VLS and the remote device. Accordingly, automigration automatically matches barcode and tape sizes between the local VLS and remote devices. If the virtual tape is modified on the local VLS, the virtual tape is automatically copied to the matching remote tape.

It may be desirable to eject the tape from the remote device, e.g., for long-term archiving. In the case of a remote VLS, "ejecting" the tape means moving the virtual tape out of the virtual library and into a designated location often referred to as a "fire safe." The fire safe is "hidden" from the backup application so that the remote tape appears to the backup application as having been ejected. Whether the remote tape is physically ejected or "ejected" from the VLS, the matching tape at the local VLS is also ejected. Again, "ejecting" the tape from the VLS is accomplished by removing the local tape to the local fire safe and then, for housekeeping purposes, automatically deleting the local tape from the fire safe after a predetermined time.

The systems and methods described herein enable an automatic tape recycling system for virtual library products. The systems and methods may be implemented between two virtual libraries (e.g., local and remote virtual libraries) to move the tape on the local virtual library to the remote virtual library. That is, after the remote copy is complete the local copy is automatically deleted and the remote copy is "ejected" from the virtual library. The ejected tapes are then automatically "recycled" after a predetermined time so that the once-ejected tapes are reloaded back into the remote virtual library. The ejected tapes may be recycled based on a recycle policy (e.g., including user-defined criteria). In addition, new virtual tapes may be automatically created to feed into the virtual library as needed.

In exemplary embodiments, any backup application that supports tape-to-tape copy may be implemented without needing direct integration between the backup application and the virtual libraries. In addition, the customer can have different data retention times between the local virtual library and the remote virtual library. For example, the customer may store one month of backups locally while storing 6 months of backups at the remote virtual library.

Before continuing, it is noted that non-tape "libraries" may also benefit from the teachings described herein, e.g., files sharing in network-attached storage (NAS) or other backup devices. In addition, the remote virtual library (or more generally, "target") may be physically remote (e.g., in another room, another building, offsite, etc.) or simply "remote" relative to the local virtual library. It is also noted that exemplary operations described herein for enhanced virtual storage replication may be embodied as logic instructions on one or more computer-readable medium. When executed by one or more processor, the logic instructions cause a general purpose computing device to be programmed as a special-purpose machine that implements the described operations.

FIG. 1 is a high-level diagram showing an exemplary storage system 100 including both local storage 110 and remote storage 120. The storage system 100 may include one or more storage cells 120. The storage cells 120 may be logically grouped into one or more virtual library storage (VLS) 125a-c (also referred to generally as local VLS 125) which may be accessed by one or more client computing device 130a-c (also referred to as "clients"), e.g., in an enterprise. In an exemplary embodiment, the clients 130a-c may be connected to storage system 100 via a communications network 140 and/or direct connection (illustrated by dashed line 142). The communications network 140 may include one or more local area network (LAN) and/or wide area network (WAN). The storage system 100 may present virtual libraries to clients via a unified management interface (e.g., in a backup application).

It is also noted that the terms "client computing device" and "client" as used herein refer to a computing device through which one or more users may access the storage system 100. The computing devices may include any of a wide variety of computing systems, such as stand-alone personal desktop or laptop computers (PC), workstations, personal digital assistants (PDAs), server computers, or appliances, to name only a few examples. Each of the computing devices may include memory, storage, and a degree of data processing capability at least sufficient to manage a connection to the storage system 100 via network 140 and/or direct connection 142.

In exemplary embodiments, the data is stored on one or more local VLS 125. Each local VLS 125 may include a logical grouping of storage cells. Although the storage cells 120 may reside at different locations within the storage system 100 (e.g., on one or more appliance), each local VLS 125 appears to the client(s) 130a-c as an individual storage device. When a client 130a-c accesses the local VLS 125 (e.g., for a read/write operation), a coordinator coordinates transactions between the client 130a-c and data handlers for the virtual library.

Redundancy and recovery schemes may be utilized to safeguard against the failure of any cell(s) 120 in the storage system. In this regard, storage system 100 may communicatively couple the local storage device 110 to the remote storage device 150 (e.g., via a back-end network 145 or direct connection). In an exemplary embodiment, the back-end network 145 is a WAN and may have only limited bandwidth. As noted above, remote storage device 150 may be physically located in close proximity to the local storage device 110. Alternatively, at least a portion of the remote storage device 150 may be "off-site" or physically remote from the local storage device 110, e.g., to provide a further degree of data protection.

Remote storage device 150 may include one or more remote virtual library, system (VLS) 155a-c (also referred to generally as remote VLS 155) for replicating data stored on one or more of the storage cells 120 in the local VLS 125. Although not required, in an exemplary embodiment, deduplication may be implemented for replication.

Deduplication has become popular because as data growth soars, the cost of storing data also increases, especially backup data on disk. Deduplication reduces the cost of storing multiple backups on disk. Because virtual tape libraries are disk-based backup devices with a virtual file system and the backup process itself tends to have a great deal, of repetitive data, virtual tape libraries lend themselves particularly well to data deduplication. In storage technology, deduplication generally refers to the reduction of redundant data. In the deduplication process, duplicate data is deleted, leaving only one copy of the data to be stored. However, indexing of all data is still retained should that data ever be required. Deduplication is able to reduce the required storage capacity.

With a virtual tape library that has deduplication, the net effect is that, over time, a given amount of disk storage capacity can hold more data than is actually sent to it. For purposes of example, a system containing 1 TB of backup data which equates to 500 GB of storage with 2:1 data compression for the first normal full backup.

If 10% of the files change between backups, then a normal incremental backup would send about 10% of the size of the full backup or about 100 GB to the backup device. However, only 10% of the data actually changed in those files which equates to a 1% change in the data at a block or byte level. This means only 10 GB of block level changes or 5 GB of data stored with deduplication and 2:1 compression. Over time, the effect multiplies. When the next full backup is stored, it will not be 500 GB, the deduplicated equivalent is only 25 GB because the only block-level data changes over the week have been five times 5 GB incremental backups. A deduplication-enabled backup system provides the ability to restore from further back in time without having to go to physical tape for the data.

Regardless of whether deduplication is used, the transfer of data from the local storage device to the remote storage device and data handling may be enhanced by enabling different retention times for data stored at the local and remote virtual libraries. Replication and data handling may also be enhanced by automatically recycling tapes that have been ejected from the remote virtual library based on a recycling policy. Enhanced virtual storage replication as such may be better understood by the following discussion and with reference to FIG. 2.

Figure 2:
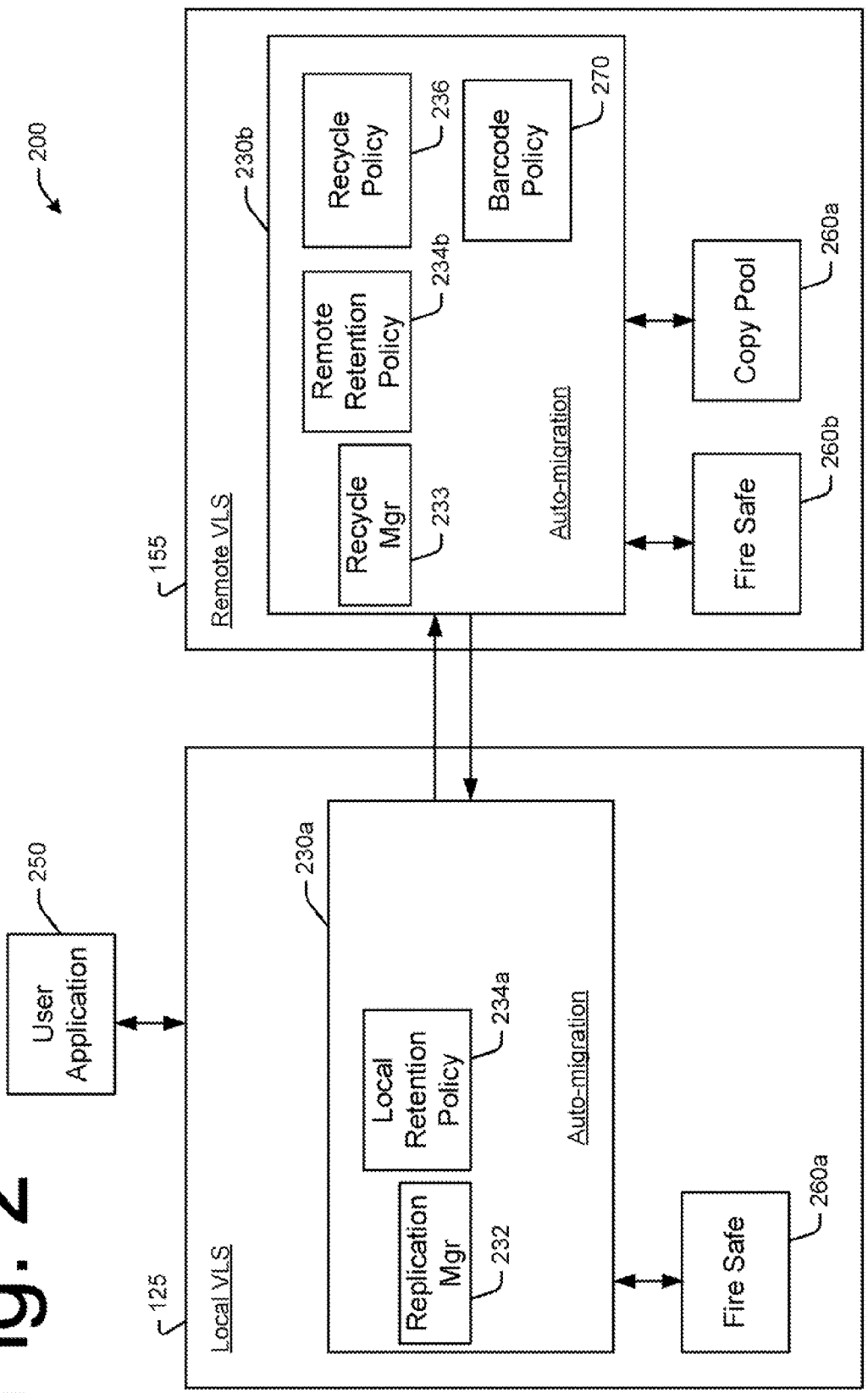
FIG. 2 shows an exemplary software architecture which may be implemented in the storage system for enhanced virtual storage replication.

FIG. 2 shows an exemplary software architecture 200 which may be implemented in the storage system 100 for enhanced virtual storage replication. The software architecture 200 may comprise an automigration component 230a, 230b implemented in program code at each of the local VLS 125 and remote VLS 155. The automigration component 230a at the local VLS 125 may be communicatively coupled to the automigration component 230b at the remote VLS 155 to handle replication between the local VLS 125 and remote VLS 155.

At the local VLS 125, automigration component 230a may also include a replication manager 232. Replication manager 232 may cooperate with the automigration component 230b at the remote VLS 155 to move at least one virtual tape from the local VLS 125 to the remote VLS 155. Replication manager 232 may be implemented as program code, and is enabled for managing replication of data between the local VLS 125 and remote VLS 155.

In order to replicate data from the local VLS 125 to the remote VLS 155, the replication manager 232 provides a software link between the local VLS 125 and the remote VLS 155. The software link enables data (e.g., copy/move jobs, setup actions, etc.) to be automatically transferred from the local VLS 125 to the remote VLS 155. In addition, the configuration, state, etc. of the remote VLS 155 may also be communicated between the automigration components 230a, 230b.

It is noted that although implemented as program code, the automigration components 230a, 230b may be operatively associated with various hardware components for establishing and maintaining a communications link between the local VLS 125 and remote VLS 155, and for communicating the data between the local VLS 125 and remote VLS 155 for replication.

It is also noted that the software link between automigration layers 230a, 230b may also be integrated with deduplication technologies. In this regard, exemplary embodiments may be implemented over a low-bandwidth link, utilizing deduplication technology inside the virtual libraries to reduce the amount of data transferred over the link.

In use, the user can setup enhanced replication at the local VLS 125 via the replication manager 232, and run tape-to-tape copies in a user application 250 (e.g., the backup application) to replicate data from the local VLS 125 back into itself onto the tapes in a copy pool. These copy tapes are then automatically moved to the remote VLS 155 and new replacement tapes for subsequent copies are recycled/created. Accordingly, any backup application that supports tape-to-tape copy may be implemented without needing any direct integration between the backup application 250 and the virtual libraries 125, 155.

The automigration component 230b may also include a recycle manager 233 which may implement recycling operations using a recycle policy 236. When a modified tape is successfully copied to the matching tape on the remote VLS 155, the remote tape is automatically ejected (e.g., into the remote fire safe 260b or "hidden" location). The existing functionality therefore automatically ejects the matching local tape (e.g., into the local fire safe 260*a*), and then automatically deletes the local tape. This may occur immediately if the default expiration policy for ejected tapes is set to zero days, or at some other suitable time (e.g., during off-hours). Accordingly, the modified tape has been moved to the remote virtual library and is effectively stored in the remote fire safe 260*b*.

The ejected tapes may be automatically replaced by new or recycled tapes for the next replication cycle. In this regard, the user may specify a retention policy defining how long to wait before recycling tapes. The retention policy may match the retention policy defined in the user's backup application.

In an exemplary embodiment, automigration components 230*a*, 230*b* may include separate retention policies, e.g., a local retention policy 234*a* at the local VLS 125 and a remote retention policy 234*h* at the remote VLS 155. Accordingly, the user can have different data retention times at the local VLS 125 and the remote VLS 155. For example, the user may store one month of backups locally while storing six months of backups remotely.

The user may also create a barcode policy 270 defining new tapes. Accordingly, the remote VLS 155 uses these policy settings to replace the ejected tapes. Tapes may be replaced by either moving existing tapes in the fire safe 260*b* that are older than the defined recycle time in the recycle policy 236, or automatically create new tapes (e.g., if there are not enough tapes to replace the number of ejected tapes).

Alternatively, the user may define in the barcode policy 270 a minimum number of tapes specifying how many tapes should be in the copy pool 280. If this option is used, then if the number of recycled tapes is less than the minimum tapes number then the remaining tapes are automatically created based on the barcode policy 270 to meet this minimum number.

It should be noted that when an existing tape in the remote fire safe 260*b* is recycled by moving the tape back into the remote VLS 155, this process automatically creates a matching tape in the local VLS 125 including tape information (e.g., the header originally written by the backup application).

If the user needs to restore from a remote tape in the remote virtual library, the user can move the tape out of the remote fire safe 260*b* into the remote VLS 155 and either restore the tape directly from the remote VLS 155, or transfer the tape back to the local VLS 125 for restore operations.

It is noted that the "eject" and recycle operations may automatically repeat on any suitable basis. For example, these operations may be invoked on a periodic or other timing basis, or based at least in part on other parameters such as usage. In another example, the eject and recycle operations may only be invoked in response to user input.

FIG. 3 is a flow diagram 300 illustrating exemplary operations which may be implemented for enhanced virtual storage replication. In operation 310, a virtual tape is moved from a local virtual library to a remote virtual library. For example, moving the virtual tape may comprise waiting for a copy operation to complete at the remote virtual library, and then deleting the virtual tape from the local virtual library.

In operation 320, the virtual tape moved to the remote virtual library in operation 310 is ejected. For example, the virtual tape may be moved based on a local retention policy. In operation 330, the ejected virtual tape is recycled based on a remote retention policy. The retention policy may be user-defined. The local retention policy may define a different retention time than defined by a remote retention policy.

Other operations not shown in FIG. 3 may also be implemented in other embodiments. Further operations may include creating new virtual tapes on an as-needed basis. For example, creating new virtual tapes may be based on a barcode policy. The barcode policy may define a minimum number of virtual tapes for backup operations at the local virtual library. The new virtual tapes may be created when the number of virtual tapes available for backup operations at the local virtual library is less than the minimum number of virtual tapes defined in the barcode policy.

It is noted that when ejecting and recycling tapes (based on recycling and retention policies) the backup and recycling managers can manage the data in each virtual library without modification to the backup application. Note that the larger virtual libraries have multiple virtual library servers or 'emulations' of servers within one library, so the backup and recycling managers may dynamically control the replication jobs per server and evenly distribute the jobs across the servers based on job limits per server.

It is noted that retention times and recycling policies, such as described herein, may be based on any of a variety of different factors, such as, but not limited to, storage limitations, corporate policies, legal requirements, or as otherwise determined by the user.

It is noted that the exemplary embodiments shown and described are provided for purposes of illustration and are not intended to be limiting. Still other embodiments are also contemplated for enhanced virtual storage replication.

The invention claimed is:

1. A method of enhanced virtual storage replication, comprising:
   moving a virtual tape from a local virtual library to a remote virtual library;
   ejecting the virtual tape from the remote virtual library, wherein ejecting the virtual tape removes access to the virtual tape b a back up application; and
   recycling the ejected virtual tape at the remote virtual library after a predetermined time based on a remote retention policy, wherein recycling is by moving the ejected virtual tape back into the remote virtual library.

2. The method of claim 1, further comprising creating new virtual tapes on an as-needed basis based on a barcode policy.

3. The method of claim 2, wherein the barcode policy defines a minimum number of virtual tapes for backup operations at the local virtual library.

4. The method of claim 3, wherein the new virtual tapes are created when the number of virtual tapes available for backup operations at the local virtual library is less than the minimum number of virtual tapes defined in the barcode policy.

5. The method of claim 1, wherein the retention policy is user-defined.

6. The method of claim 1. wherein the virtual tape is moved based on a local retention policy.

7. The method of claim 6, wherein the local retention policy defines a different retention time than defined by the remote retention policy.

8. The method of claim 1, wherein moving the virtual tape includes:
   waiting for a copy operation to complete at the remote virtual library; and
   deleting the virtual tape from the local virtual library.

9. The method of claim 1, further comprising:
   removing the virtual tape from the remote virtual library into a remote fire safe hidden from the backup application;
   after removing the virtual tape from the remote virtual library, removing a matching virtual tape at the local virtual library to a local fire safe; and automatically deleting the virtual tape from the local fire safe after a predetermined time.

10. A system comprising:
a local virtual library configured with a plurality of virtual tapes;
a replication manager executing at the local virtual library, the replication manager moving at least one of the virtual tapes to a remote virtual library based on input from a backup application, wherein the at least one of the virtual tapes is returned from a local fire safe to the local virtual library based on a local retention policy; and
wherein a virtual tape ejected at the remote virtual library is recycled after a predetermined time based on a remote retention policy, wherein recycling is by moving the ejected virtual tape back into the remote virtual library and automatically creating matching tape of at least one of the plurality of virtual tapes in the local virtual library based on the remote retention policy.

11. The system of claim 10, wherein the replication manager creates new virtual tapes on an as-needed basis.

12. The system of claim 11, further comprising a barcode policy for creating the new virtual tapes.

13. The system of claim 12, wherein the barcode policy defines a minimum number of virtual tapes for backup operations at the local virtual library.

14. The system of claim 13, wherein the new virtual tapes are created when the number of virtual tapes available for backup operations at the local virtual library is less than the minimum number of virtual tapes defined in the barcode policy.

15. The system of claim 10, wherein the replication manager moves the virtual tape by:
waiting for a copy operation to complete at the remote virtual library; and
deleting the virtual tape from the local virtual library.

16. A system comprising:
a remote virtual library configured to operate with a local virtual library having a plurality of virtual tapes; and
a recycling manager executing at the remote virtual library, the recycling manager ejecting at least one of the virtual tapes moved to the remote virtual library from the local virtual library based on input from a backup application, and the recycling manager returning the at least one virtual tapes to the remote virtual library and automatically creating matching tape of at least one of the virtual tapes in the local virtual library based on a remote retention policy.

17. The system of claim 16, wherein the retention policy is user-defined.

18. The system of claim 16, wherein the virtual tape is moved based on a local retention policy.

19. The system of claim 16, wherein the local retention policy defines a different retention time than defined by the remote retention policy,

* * * * *

UNITED STATES PATENT AND TRADEMARK OFFICE
CERTIFICATE OF CORRECTION

PATENT NO.       : 8,850,142 B2                                      Page 1 of 1
APPLICATION NO.  : 12/560268
DATED            : September 30, 2014
INVENTOR(S)      : Stephen Gold It is certified that error appears in the above-identified patent and that said Letters Patent is hereby corrected as shown below:

In The Claims

In column 6, line 35, in Claim 1, delete "b a back up" and insert -- by a backup --, therefor.

In column 6, line 51, in Claim 6, delete "claim 1." and insert -- claim 1, --, therefor.

In column 8, line 26, in Claim 19, delete "policy," and insert -- policy. --, therefor.

Signed and Sealed this
Tenth Day of February, 2015

Michelle K. Lee
*Deputy Director of the United States Patent and Trademark Office*